United States Patent [19]

Stephens et al.

[11] 3,955,140
[45] May 4, 1976

[54] MOBILE RADIO EXTENSION UNIT WITH PUNCH THROUGH OPERATION

[75] Inventors: Berton H. Stephens, Los Altos; Jack Bradley, Cupertino, both of Calif.

[73] Assignee: Public Systems, Inc., Sunnyvale, Calif.

[22] Filed: May 20, 1975

[21] Appl. No.: 579,166

[52] U.S. Cl. .................................... 325/4; 325/22; 325/55; 325/57
[51] Int. Cl.² .......................................... H04B 7/14
[58] Field of Search .................................. 325/2–5, 325/21, 22, 53, 55, 57, 64; 179/41 A; 343/175–180

[56] References Cited
UNITED STATES PATENTS

| | | | |
|---|---|---|---|
| 2,731,622 | 1/1956 | Doremus et al. | 325/57 |
| 2,932,729 | 4/1960 | Yamato et al. | 325/57 |
| 2,987,615 | 6/1961 | Dimmer | 325/57 |
| 3,366,880 | 1/1968 | Driver | 325/22 |
| 3,387,212 | 6/1968 | Kaufman | 325/57 |
| 3,745,462 | 7/1973 | Trimble | 325/4 |

*Primary Examiner*—Robert L. Griffin
*Assistant Examiner*—Jin F. Ng
*Attorney, Agent, or Firm*—Townsend and Townsend

[57] ABSTRACT

A mobile radio extension unit for converting a conventional mobile transceiver having a transmitter and a receiver to use as a repeater or transponder for establishing a bidirectional communications link between a transceiver of limited range and a base station or other mobile transceivers in the network. In a mobile communications system network having a plurality of extension units, associated mobile radios, and limited range transceivers, each extension unit includes means for automatically inhibiting multiple transmissions by units within range of one another and for providing punch through priority communications from a limited range transceiver to the base station or other mobile transceivers via one selected extension unit when the receiver associated therewith is repeating a communication to the transceiver.

10 Claims, 7 Drawing Figures

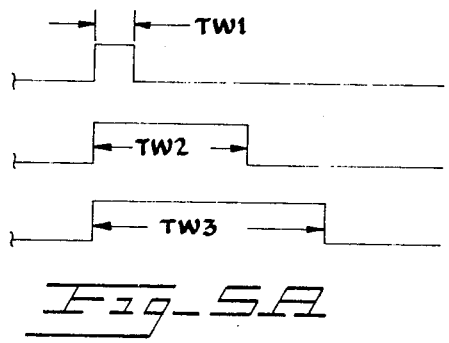
Fig_5A
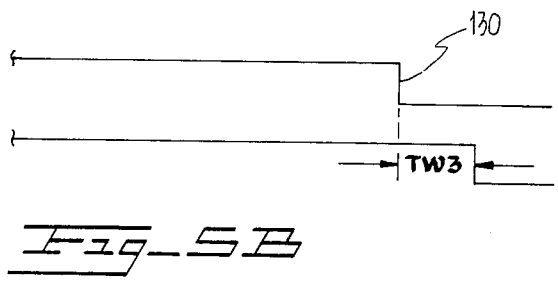
Fig_5B
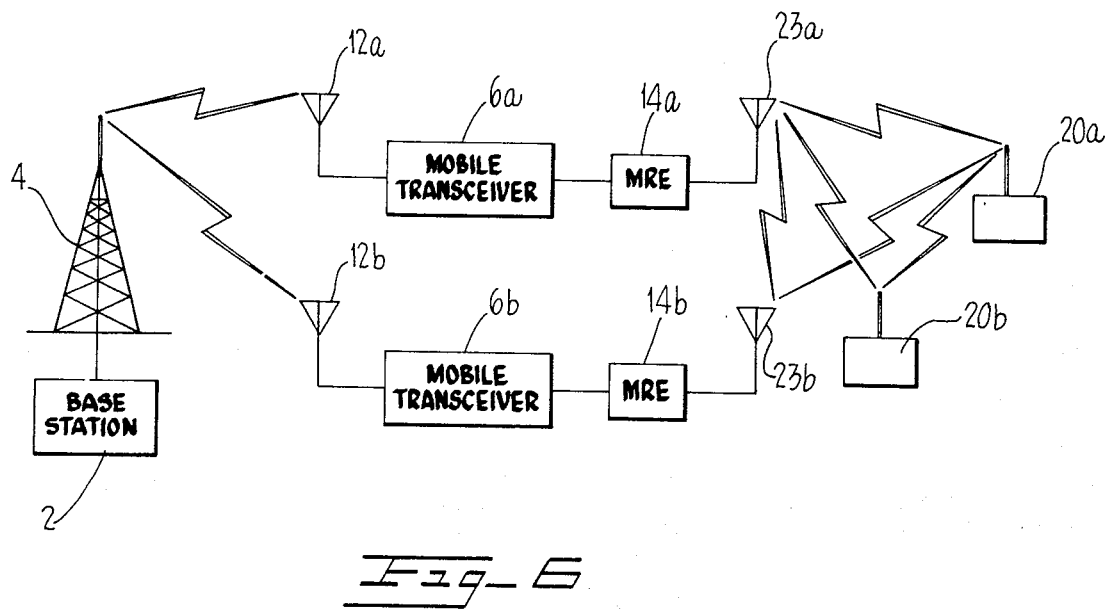
Fig_6

MOBILE RADIO EXTENSION UNIT WITH PUNCH THROUGH OPERATION

BACKGROUND OF THE INVENTION

This invention relates to two-way communications systems and more particularly to an improved system for permitting remote use of a mobile transceiver.

In U.S. Pat. No. 3,745,462, the disclosure of which is hereby incorporated by reference, a mobile bidirectional communication system is disclosed in which a plurality of conventional mobile transceivers, typically mounted in an automotive vehicle, are each provided with a mobile radio extension unit permitting the receiver and transmitter of the mobile transceiver to function as a repeater or as a transponder in connection with a handheld portable transceiver of limited range located in the proximity of the automotive vehicle. Each mobile radio extension unit is provided with a separate transmitter and receiver having a different operating frequency $f_2$ from that of the mobile transceiver $f_1$ for enabling simplex mode bidirectional communication between any portable transceiver within range and the base station or a different mobile transceiver from that associated to a selected mobile radio extension unit. The system operates in such a manner that only one mobile radio extension unit in the network can communicate between one or more portable transceivers and the base or other station at any given time, the remaining extension units in the network being disabled by contemporaneous detection of the carrier frequency $f_2$ used to communicate between the selected extension unit and the portable transceiver, and the carrier frequency $f_1$ used to communicate between the selected extension unit and the base or other station. In order to provide automatic selection of a single extension unit, each unit is provided with an internal sampling clock having a different sampling frequency from the other units for enabling periodic detection of the base station carrier $f_1$, the extension unit carrier $f_2$ and a signalling tone generated by the portable transceiver when the operator desires to transmit a message to the base or other station via an extension unit. Since the sampling clocks have different frequencies, there is a high statistical probability that no two clocks will simutaneously enable their associated units, and each unit is provided with control circuitry for preventing active operation when both the base station carrier $f_1$ and the mobile radio extension unit carrier $f_2$ are being received.

The above system can be applied to a wide range of applications with beneficial results. In one application, the base station comprises a police or fire department dispatcher while the mobile transceivers comprise conventional units presently used in police or fire vehicles. The mobile radio extension units are also located in the vehicles and connected to the associated mobile transceiver. With this configuration, none of the normal functions of the mobile transceivers are impaired, but the portable transceivers can be employed by a policeman or fireman when away from the vehicle. Since each portable transceiver need only have the capacity to communicate with a nearby vehicle-mounted MRE Unit, the portable transceivers are extremely small in size and lightweight. In addition, since any portable transceiver is capable of communicating with any MRE unit, it is not necessary to assign specific portable transceivers to specific MRE units.

However, in the above system, once the mobile radio extension unit is engaged in the repeat to portable mode, the portable transceiver is incapable of transmitting a message back to the base station or to another mobile transceiver until the signal being received on the base station frequency $f_1$ terminates. In many circumstances, this inability of the portable transceiver to interrupt the reception of a signal from the base station or another mobile transceiver and transmit a message back to the base station or the other mobile transceiver, a process which is commonly known as "punch through", is undesirable. For example, if a policeman on foot patrol encounters a sudden emergency when a message is being received on his portable transceiver, the urgency of the emergency may require that a message be immediately transmitted back to the base station or other mobile transceivers in the network (such as a request for assistance, an ambulance, or the like), rather than after an indeterminate period of transmission to the portable transceivers in the network. Similarly, under certain atmospheric conditions skip signals from an extra-network transmitter can be received by the mobile transceivers in the network and repeated to the portable transceivers. Without the ability to punch through these interfering signals, communication from the portable transceivers to the base station or other mobile transceivers in the network is blocked. To date, efforts to design a communications network having the advantages of the system described above and the added advantage of a punch through capability have not met with success.

SUMMARY OF THE INVENTION

The invention comprises a mobile communications network employing a plurality of mobile radio extension units each having a separate transmitter and receiver for use in conjunction with a conventional mobile radio two-way transceiver and a portable unit and each provided with punch through capability. The punch through capability is effected by means enabled when a selected unit is repeating a message from a base station or another mobile transceiver in the network to one or more portable transceivers for periodically interrupting transmission to the portable transceivers and sampling the extension unit receiver output to determine the presence of a relatively high frequency carrier and a low frequency tone signal generated by a portable transceiver, and means responsive to the detection of such a carrier and a tone for switching the extension unit to the reverse mode of communication to enable the portable transceiver to communicate with the base station or other mobile transceivers in the network. In the preferred embodiment, the sampling means generates a low frequency periodic signal providing a detection window sufficiently narrow to prevent serious degradation of the message being repeated to the portable transceiver but sufficiently wide to enable detection of the portable transceiver carrier. If the carrier is detected during the detection window, the sampling means widens the window sufficiently to detect the tone signal. Each unit is also provided with means for preventing a different extension unit from being selected during the time that the selected unit is seeking the portable transceiver carrier and tone and transmission to the portable transceiver has been temporarily interrupted.

For a fuller understanding of the nature and advantages of the invention, reference should be had to the ensuing detailed description taken in conjunction with the accompanying drawings.

BRIEF DESCRIPTION OF THE DRAWINGS

FIGS. 5A and B are timing diagrams illustrating operation of the punch through feature; and FIG. 6 is a block diagram showing a plurality of stations in a communications network.

DESCRIPTION OF THE PREFERRED EMBODIMENTS

Figure 1:
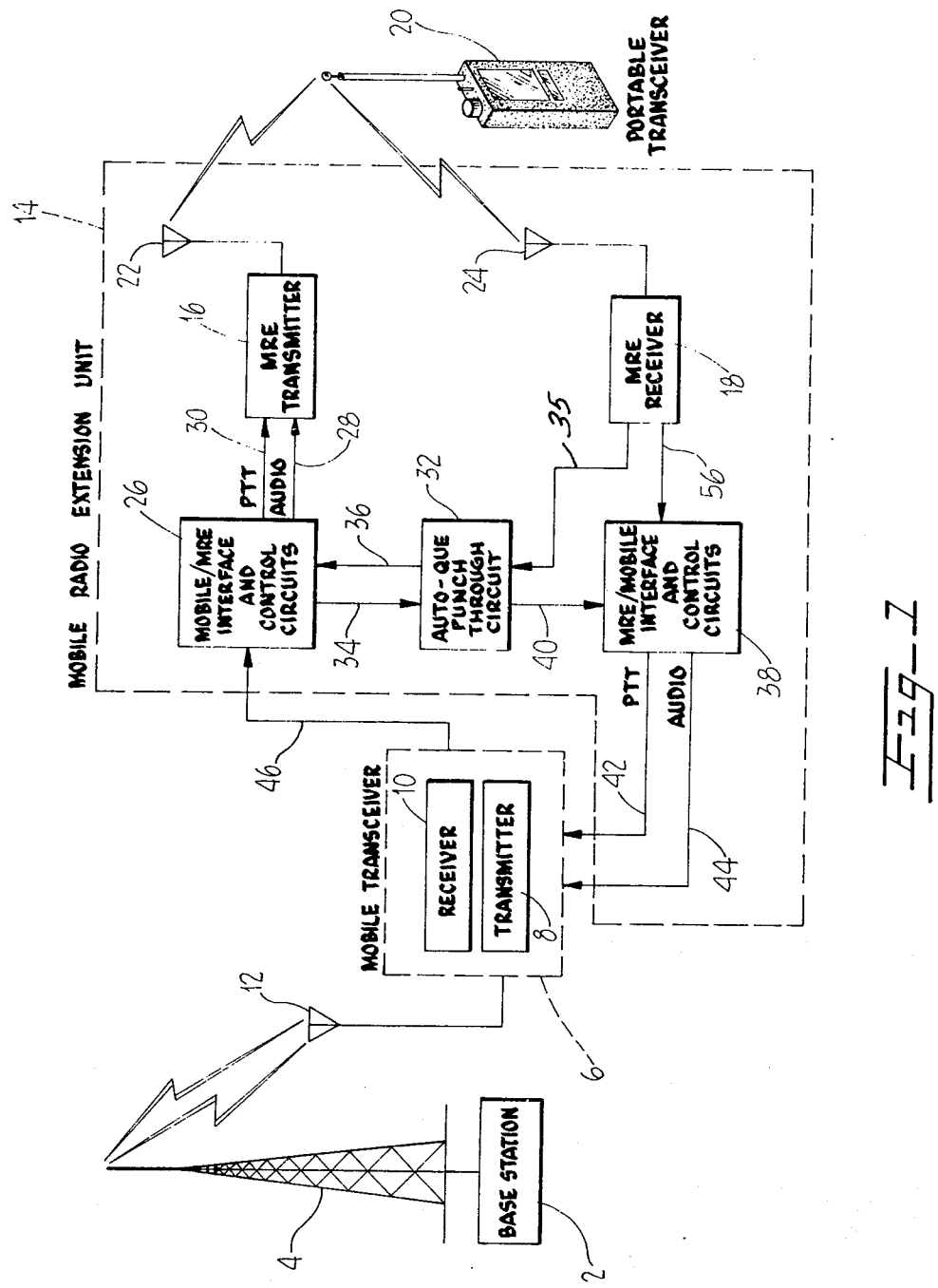
FIG. 1 is a block diagram of the overall communications system showing a single mobile transceiver, mobile radio extension unit and portable transceiver.

Turning now to the drawings, FIG. 1 is a block diagram illustrating the system of the invention. A base station 2, including a conventional transmitter and receiver, radiates and receives signals on a conventional antenna 4. Preferably, transmission and reception are made on the same frequency $f_1$, although split frequencies may be employed, if desired, by the use of additional equipment. Further, although frequency modulation is the preferred mode of communication, any suitable type of modulation may be employed, as desired. A conventional mobile transceiver 6 having a transmitter 8 and receiver 10 transmits and receives the frequency $f_1$ via a mobile antenna 12. A mobile ratio extension unit 14 typically located in close physical proximity to the mobile transceiver 6 operates in conjunction therewith.

The mobile radio extension unit (MRE) 14 includes an MRE transmitter 16 and an MRE receiver 18 which are interfaced to the mobile transceiver 6 and which communicate to a portable transceiver 20 via a pair of antennae 22, 24 or, alternatively, via a single antenna 23 described below. In the preferred embodiment, communication between MRE 14 and portable transceiver 20 is accomplished in a frequency modulation mode using a different frequency $f_2$. If desired, other known types of modulation may be employed.

Mobile receiver 10 is coupled to MOBILE/MRE interface and control circuits 26 in MRE unit 14. Audio from the receiver 10 is coupled to the MRE transmitter 16 via line 28. A push-to-talk (PTT) or transmitter control line 30 is actuated by control circuits 26 in the manner described below.

Figure 2:
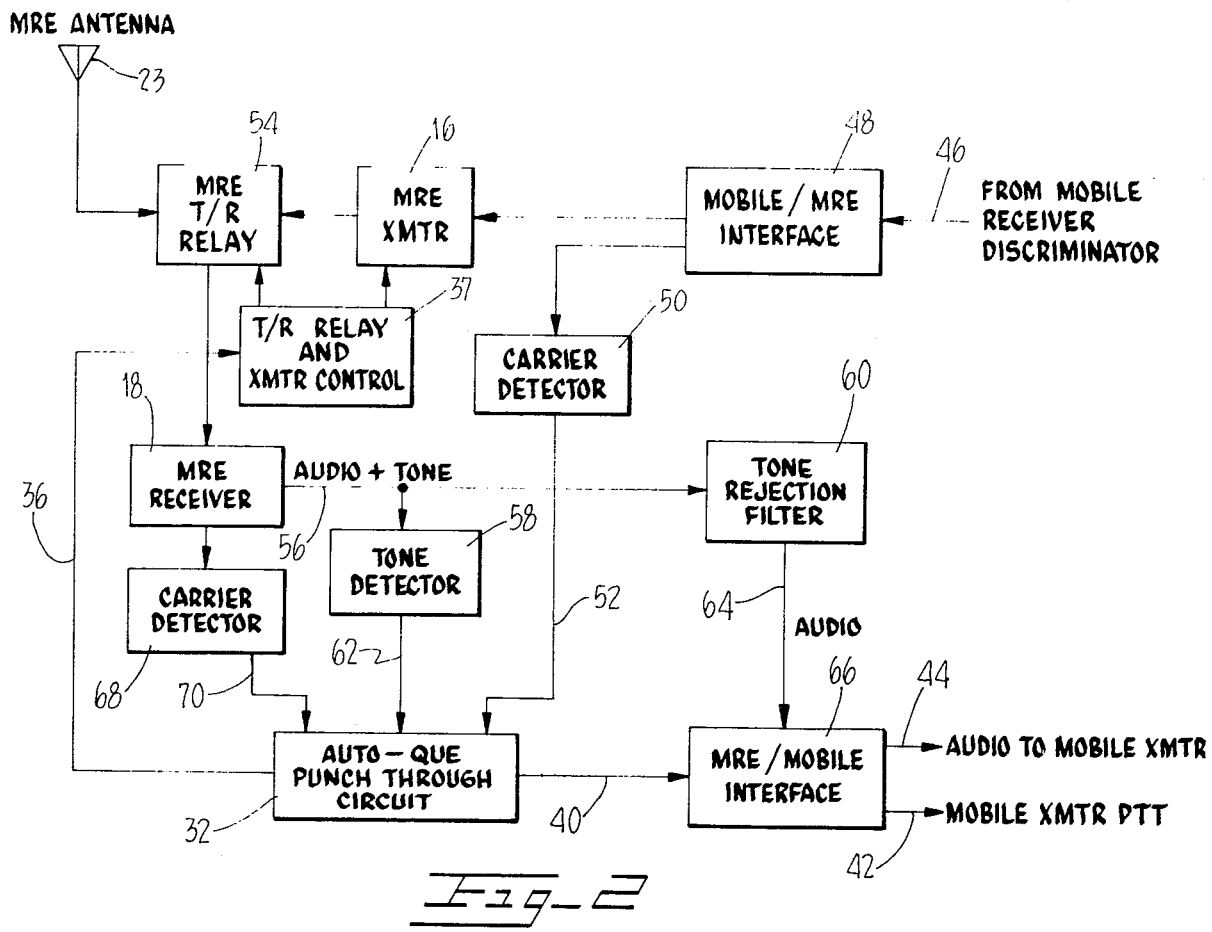
FIG. 2 is a block diagram of the mobile radio extension unit.
Figure 3:
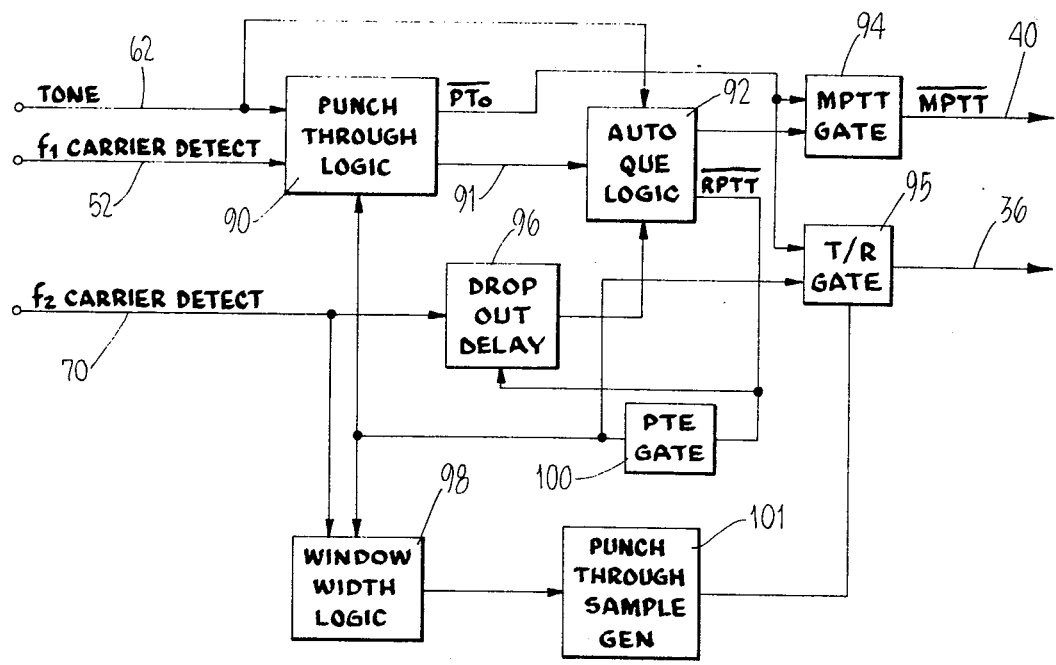
FIG. 3 is a block diagram of the auto-que/punch through portion of the unit of FIG. 2.
Figure 4:
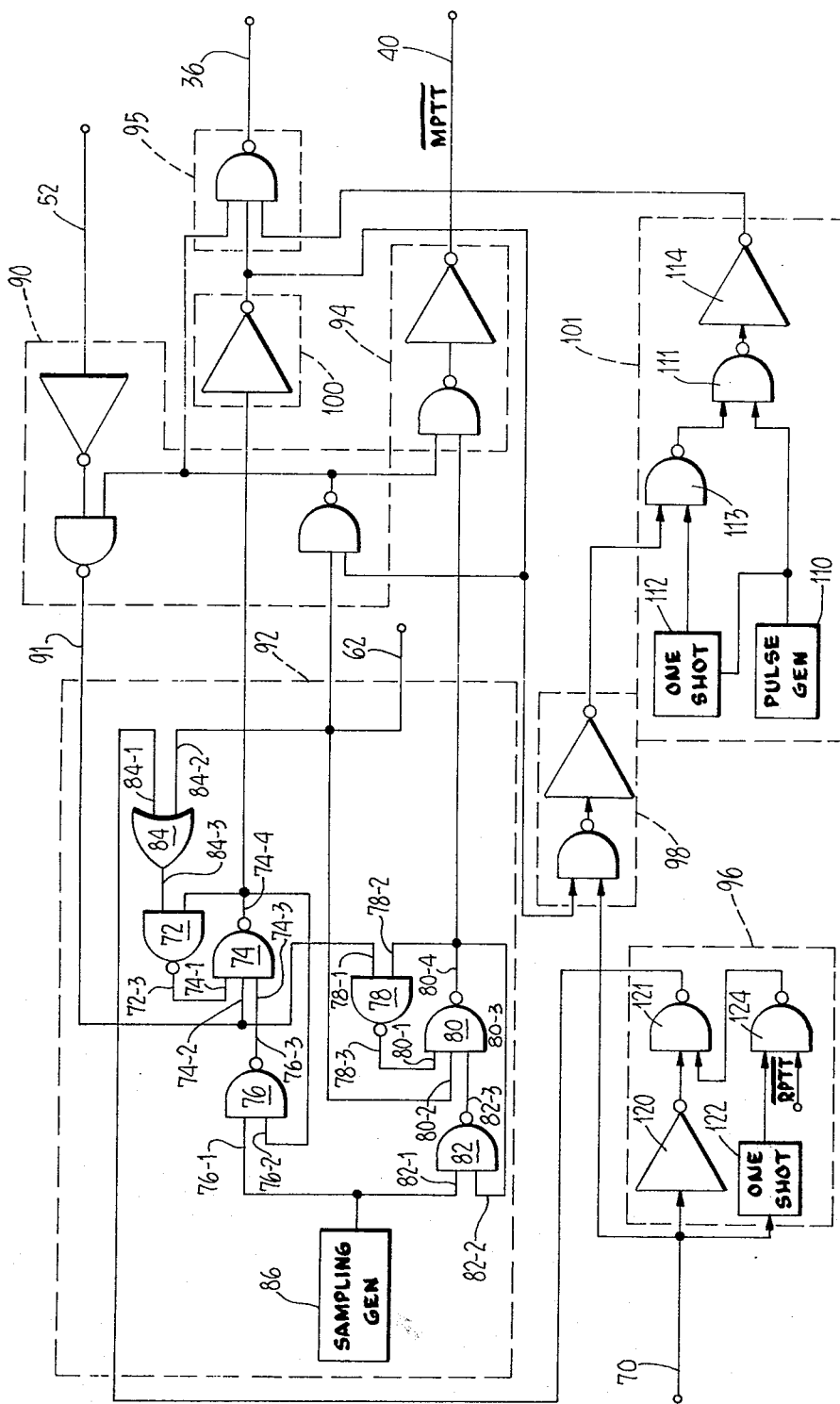
FIG. 4 is a logic diagram of the auto-que/punch through circuit.

An auto-que/punch through circuit 32, described in greater detail in connection with the description of FIGS. 2–4, is coupled to unit 26 by line 34 and provides control signals on line 36 for actuating the MRE transmitter 16 to complete a communications link from base station 2 or other mobile transceivers 6 in the network to the portable transceiver 20.

MRE receiver 18 is coupled to the auto-que/punch through circuit 32 via line 35 and is coupled to an MRE/MOBILE interface and control circuit unit 38 via line 56. Upon receipt of a control signal on line 40 from auto-que/punch through circuit 32, the PTT line 42 controlling the transmitter 8 is actuated and audio is supplied thereto on line 44.

The auto-que/punch through circuit 32 automatically provides control signals to either of the two interface units 26, 38 in order to establish a base station to portable transceiver or a portable transceiver to base station link, respectively, and also functions to automatically switch the communications link from a base station-portable transceiver mode to a portable transceiver-base station mode whenever portable transceiver 20 is receiving a message from base station 2 and the operator causes the $f_2$ carrier and a characteristic tone to be generated signifying his desire to communicate back to the base station 2. In addition, auto-que/punch through circuit 32 functions to prevent communication between base station 2 and portable transceiver 20 via the associated mobile transceiver 6 whenever any other single one of the plurality of MRE units 14 employed in the network has already established such a communication link.

It is noted that both base station 2 and other mobile transceivers 6 in the network can communicate with the portable transceiver 20 via the associated extension unit 14. To avoid prolixity, the ensuing description is limited to communication between base station 2 and portable transceiver 20. It is understood, however, that the term base station encompasses both base station 2 and the remaining mobile transceivers 6 in the network.

In order to actuate interface unit 26 to establish the base-portable link, a carrier signal from the base station must be continuously received subsequent to the simultaneous occurrence of an internally generated clock signal occurring a random time after the initiation of the base station carrier signal and no signal from a portable transceiver or another MRE transmitter 16 within range must be contemporaneously present. The auto-que/punch through circuit 32 automatically actuates interface unit 38 to establish a portable transceiver to base station link when a signal from the portable transceiver is continuously received subsequent to the simultaneous occurrence of a clock signal occurring a random time after the initiation of the portable transceiver signal and no signal from a base station or another mobile station within range must be simultaneously present.

FIG. 2 is a block diagram of MRE unit 14 illustrating the individual elements in greater detail. Line 46 from the discriminator of the mobile receiver 10 is coupled to the MOBILE/MRE interface 48, which preferably includes a de-emphasis network, a high pass filter and an amplifier for supplying audio input signals at the proper level to the MRE transmitter 16. A carrier detector 50, which comprises a squelch detector in a frequency modulation system, determines when the mobile receiver is receiving a signal. It should be noted that other types of detectors may be employed, depending on the type of modulation employed with the system. The presence of the carrier results in a control signal of a given sense, which may be referred to as a transmission request or keying signal, indicating that the base station 2 is attempting to seize MRE unit 14 via lead 52 coupled to auto-que/punch through circuit 32. Under the conditions described below, circuit 32 provides a control signal of one sense on line 36 that actuates the transmit/receive (T/R) relay and transmitter (XMTR) control unit 37 to couple the output of MRE transmitter 16 to MRE antenna 23 and actuate MRE transmitter 16.

In the unactuated state, MRE T/R relay 54 couples signals received by MRE antenna 23 from portable transceivers 20 or other MRE transmitters 16 within range to MRE receiver 18. Portable transceiver 20 is provided with circuitry for continuously transmitting a characteristic signal, e.g. a 100 HZ subaudible tone, in response to the actuation of a switch by an operator intending to form a link to the base station 2. The tone is not transmitted when the operator intends to communicate only with another portable transceiver 20. When the portable transceiver 20 is transmitting a tone, the audio signal from that transceiver together with the tone are concurrently present on line 56 from MRE receiver 18. Line 56 is coupled to a tone detector 58 and to a tone rejection filter 60. In operation, when the tone is present, the detector 58 provides a control signal of one sense on line 62 to the auto-que/punch through circuit 32. Tone rejection filter 60 functions to remove the tone and couple only the audio portion of the received signal to MRE/MOBILE interface 66 via lead 64. Interface 66 includes a push-to-talk relay and relay driver actuated by a control signal on line 40 for generating a control signal for actuating the mobile transmitter ($\overline{MPTT}$) and for coupling the audio signal to the mobile transmitter 8 under the direction of circuit 32.

A carrier detector 68, similar to detector 50 but tuned to frequency $f_2$, provides a control signal of one sense on line 70 to circuit 32 when a signal is received by MRE receiver 18. The presence of the control signal on line 62 may be referred to as a transmission request or keying signal indicating that a portable transceiver 20 is attempting to seize unit 14.

FIG. 3 shows a block diagram of auto-que/punch through circuit 32 of FIG. 2. The tone detect signal on lead 62 from tone detector 58 is coupled to an input of a punch through logic circuit 90 and also directly to an input of an auto-que logic circuit 92. The $f_1$ carrier detect signal on lead 52 from carrier detector 50 is coupled to a different input of circuit 90. The output of punch through circuit 90, designated $\overline{PTO}$ is coupled to a first input of a gate designated MPTT gate 94, and to a first input of a gate designated T/R gate 95. The remaining input to MPTT gate 94 is a first output signal from auto-que logic circuit 92, and the output signal from MPTT gate 94, designated $\overline{MPTT}$, is coupled via lead 40 to MRE/MOBILE interface unit 66.

A carrier detect signal from carrier detector 68 present on lead 70 is coupled to the transfer input of a drop-out delay circuit 96 and also to a first control input of a window width logic circuit 98. The output of drop-out delay circuit 96 is coupled to another input of auto-que logic circuit 92.

An output from auto-que logic circuit 92, designated $\overline{RPTT}$, is coupled to a control input of drop-out delay circuit 96 and also to the input of a gate designated PTE (punch through enable) gate 100. The output of PTE gate 100 is coupled to an input of T/R gate 95, to an input of punch through logic circuit 90 and a second control input of window width logic circuit 98. The output of window width logic circuit 98 is coupled to the input of a punch through sample generator 101 having an output coupled to a control input of T/R gate 95. The output of T/R gate 95 is coupled via lead 36 to T/R relay and XMTR control unit 37.

FIG. 4 is a logic diagram showing the individual elements of the auto-que/punch through circuit 32 of FIG. 3. The operation of auto-que logic circuit 92 is identical to that of the auto-que circuit 32 disclosed in detail in the abovereferenced patent. Accordingly, to avoid prolixity a detailed description of the operation thereof is omitted. Briefly, autoque logic circuit 92 responds to the detection of a mobile receiver carrier $f_1$ by generating a control signal for switching MRE transmitter 16 to a transmit mode, and responds to the detection of an MRE carrier $f_2$ and signal tone by generating a first control signal for switching MRE T/R relay 54 to the receive mode and a second control signal for switching the mobile radio transceiver to the transmit mode. Auto-que logic circuit 92 is further responsive to the simultaneous presence of mobile receiver carrier $f_1$ and MRE carrier $f_2$ or the signal tone, which occurs whenever another extension unit has been selected, for preventing operation of MRE transmitter 16, MRE T/R relay 54 and the mobile radio transmitter.

When no signals are being received, or when MRE unit 14 is in the receive mode, auto-que logic circuit 92 functions in a conventional manner. However, when an extension unit 14 has been selected and is repeating a message to one or more portable transceivers 20, an RPTT signal is generated which enables PTE gate 100 to condition punch through logic circuit 90, T/R gate 95, and window width logic circuit 98 for operation in the punch through mode. When conditioned by PTE gate 100, T/R gate 95 passes a periodic sampling signal from punch through sample generator 101 to switch MRE unit 14 temporarily to the receive mode to enable detection of an $f_2$ carrier signal, and window width logic 98 is enabled to generate a control signal for widening the sample signal if an $f_2$ carrier is subsequently detected in order to permit detection of a tone signal from a portable transceiver. If an $f_2$ carrier and a tone signal are both detected, the $\overline{PTO}$ signal output of circuit 90 changes state to generate a forcing signal on lead 91 to prevent auto-que circuit 92 from re-setting, to block T/R gate 95 so that the MRE unit 14 is held in the receive mode, and to force the output of MPTT gate 94 to a state which keys up the mobile radio transmitter 8.

With reference to FIG. 4, punch through sample generator 101 includes a free running pulse generator 110 which generates a continuous low frequency pulse train, preferably at a rate from about 1 to about 3 HZ, with each pulse having a width $TW_1$ (preferably about 10 milliseconds) sufficiently large to enable window width logic circuit 98 to sense the presence of a carrier signal from detector 68 but sufficiently small to prevent serious degradation of the audio signal being repeated to the portable transceiver 20. Th output of pulse generator 110 is coupled via a gate 111 and inverter 114 to the transfer input of T/R gate 95 and is accordingly passed therethrough whenever gate 111 and gate 95 are enabled. In addition, the output of pulse generator 110 is coupled to the trigger input of a conventional one-shot circuit 112 which generates a pulse having a width $TW2$, preferably about 200 milliseconds in duration, sufficiently great to enable tone detector 58 to sense the presence of a signal tone. This longer period $TW2$ is required because of the finite response time of tone detector 58 in the preferred embodiment. The output of one-shot circuit 112 is coupled via a gate 113, gate 111 and an inverter 114 to T/R gate 95. Thus, whenever gate 113 is enabled by the window width logic 98 at the concurrence of an enabling signal from PTE gate 100 and a carrier detect signal, the longer pulse from one-shot circuit 112 is used to control the state of MRE T/R relay 54.

Drop-out delay circuit 96 functions to prevent an unselected extension unit from responding to the absence of an MRE carrier frequency (which terminates during punch through sampling time if no portable transceiver is transmitting) and the presence of the mobile receiver carrier $f_1$. For this purpose, the output of carrier detector 68 is coupled via an inverter 120 to a first input of a gate 121 and is also coupled to the trigger input of a one-shot circuit 122. One-shot circuit 122 is triggered on the falling edge 130 of a carrier detect signal (FIG. 5B) and generates a pulse having a width TW3 greater than the width of pulse TW2 generated by one-shot circuit 112. The output of oneshot circuit 122 is coupled via a gate 124 to the remaining input of gate 121. In the selected unit, the $\overline{\text{RPTT}}$ control signal present at the second input to gate 124 disables this gate, thereby preventing the output of one-shot circuit 122 from being coupled to gate 121 and combined with the carrier detect signal present at the other input of gate 121. In an unselected unit, gate 124 is enabled by the absence of $\overline{\text{RPTT}}$ control signal, with the result that both the carrier detect signal and the output of one-shot circuit 122 are combined in gate 121, thereby inhibiting auto-que logic circuit 92 from responding to the absence of an MRE carrier signal $f_2$ for a period greater than that of the expanded sample window.

The relative duration of the pulses TW1, TW2, and TW3 is illustrated in FIG. 5A, while the relative duration of a carrier detect signal CD in a selected unit and an extended carrier detect signal CDTD in an unselected unit is illustrated in FIG. 5B. It should be noted that the waveforms shown in FIGS. 5A and 5B are illustrative only and are not drawn to scale.

Operation of the system proceeds as follows. With reference to FIG. 6, a signal base station 2 and antenna 4 is capable of communicating with two mobile transceivers 6a and 6b having antennae 12a and 12b, respectively. Each transceiver 6 is connected to an MRE unit 14a, 14b, respectively, provided with antennae 23a, 23b. Two portable transceivers 20a and 20b are shown and it is assumed that both the MRE transmitters and receivers and both portable transceivers are within range of one another.

When a message is transmitted from base station 2 at carrier frequency $f_1$, the signal is received substantially simultaneously by mobile transceivers 6a, 6b and coupled to MRE units 14a and 14b. As described more fully in the above-referenced patent, only one of the MRE units 14 is selected and this selected unit 14 repeats the message via the associated antenna 23 to both portable transceivers 20a and 20b. So long as the base station 2 continues to transmit a message, all unselected MRE units remain unselected.

When no message is being transmitted from base station 2 to the mobile units, and an operator of one of the portable transceivers 20a, 20b desires to transmit a message to base station 2, the operator initiates transmission of the portable transceiver carrier of frequency $f_2$ and a signal tone, both of which are simultaneously received by antennae 23a and 23b. As described more fully in the above-referenced patent only one of the MRE units 14 is selected and conditions the associated mobile transceiver 6 to transmit the message via the associated antenna 12 to base station 2 at the carrier frequency $f_1$. The remaining MRE units 14 remain unselected so long as the operating portable transceiver 20 is broadcasting.

When the system is in the base station to portable transceiver mode of operation, the punch through logic of the selected MRE unit 14 is enabled and the message being repeated to the portable transceivers 20a, 20b is periodically interrupted for the period TW1 in order to determine whether one of the portable transceivers 20a, 20b is attempting to communicate back to the base station, which condition is initially signified by the presence of carrier $f_2$. If the selected MRE unit 14 senses the carrier $f_2$, the detection window is widened to TW2 to sense the presence of a signal tone of relatively low frequency. If no such tone is sensed, the selected MRE Unit 14 is switched back to the repeat mode to repeat the message from the base station to the portable transceivers 20a until the generation of the next sampling pulse. If the signal tone is detected, however, the selected MRE unit 14 is switched to the transmit to base station mode and the message transmitted by one of the portable transceivers is relayed back to the base station 2 (punch through operation occurs). Concurrently, the unselected MRE units 14 are prevented by the carrier drop-out delay circuit 96 from responding to the presence of a carrier signal $f_1$ and the absence of a carrier signal $f_2$ during TW1 or TW2 (in the event that no portable transceiver is attempting to communicate with a base station 2).

As will now be apparent, systems constructed in accordance with the teachings of the invention possess all the advantages of the auto-que system disclosed and claimed in the above-referenced patent and set forth in summary form supra, and in addition enable punch through priority for communication of messages originating with the portable transceivers in the network via the previously selected extension unit. More particularly, in systems constructed in accordance with the invention, the previously selected extension unit enjoys priority in establishing a communication link between a portable transceiver and the base station or other mobile transceivers, a capability for which the term "a priori auto-que" has been coined. Thus, with the a priori auto-que capability, a person operating a portable transceiver can direct communications via a previously selected extension unit to the base station and other mobile transceivers in the network regardless of whether communications are being contemporaneously received from elsewhere in the network, or skip interference signals are being received from an extranetwork source, by the mobile transceivers.

As will be further apparent to those skilled in the art, the principles of the invention described herein are applicable to other communications network configurations. Further, as noted above, the invention is not limited to a specific type of modulation, and the same type of modulation need not be used in each portion of the system. Thus, the base station and mobile transceivers may employ frequency modulation while the MRE and portable transceivers employ amplitude modulation. In addition, while substantially identical portions of different units comprising the system have been disclosed as employing the same frequency (viz. mobile transceivers 6a, 6b using common frequency $f_1$ and portable transceivers 20a, 20b using common frequency $f_2$), split transmitting and receiving frequencies may be employed in such common portions in cases where the additional equipment required would be cost justified.

While the above provides a full and complete disclosure of the preferred embodiments of the invention, various modifications, alternate constructions and equivalents may be employed without departing from the true spirit and scope of the invention. For example, in systems employing duplex communication between the extension units and the portable transceivers the punch through capability and carrier dropout delay can be provided without the requirement of sampling the extension unit receiver by means of the punch through sample generator, since the extension unit receiver output in such a system is continuously monitored during the transmit to portable mode. Therefore, the above description and illustrations should not be construed as limiting the scope of the invention which is defined by the appended claims.

What is claimed is:

1. In a bidirectional communication system having a first carrier signal source, first transceiver means providing a communication link with said first signal source, second transceiver means for receiving and transmitting signals over a limited range, and an extension unit for establishing a communication link between said first signal source and said second transceiver via said first transceiver, the improvement wherein said extension unit includes punch through means responsive to receipt of a signal from said second transceiver means when said extension unit has established a communication link from said first signal source to said second transceiver via said first transceiver for enabling priority signal transmission from said second transceiver to said first signal source via said first transceiver, said extension unit including a transmitter and a receiver adapted to communicate with said second transceiver, and said punch through means includes sampling means for periodically interrupting transmission to said second transceiver to enable detection of said signal from said second transceiver and means responsive to detection of said last named signal for maintaining said extension unit receiver in the active state and for maintaining said first transceiver means in the transmit mode.

2. The combination of claim 1 wherein said first signal source comprises a base station.

3. The combination of claim 1 wherein said second transceiver includes means for generating at least two characteristic signals of different frequencies adapted to be detected by said extension unit, and wherein said sampling means includes means for generating a first sampling pulse train comprising a plurality of pulses each having a first period sufficiently long to permit detection of said first characteristic signal and means for generating a second sampling pulse train comprising a plurality of pulses each having a second period sufficiently long to permit detection of said second characteristic signal.

4. The combination of claim 3 wherein said sampling means includes means responsive to the detection of one of said at least two characteristic signals for enabling said second pulse train generating means.

5. A mobile transceiver extension unit for providing bidirectional communication between a first carrier signal source and a first remote transceiver of limited range operable on a second carrier signal via a second mobile transceiver including a transmitter and a receiver having a range sufficient to maintain communication with said first signal source, said mobile transceiver extension unit comprising:

a transmitter and a receiver adapted to communicate with said first remote transceiver on said second carrier signal;

first means responsive to the receipt of signals from said first source by said second transceiver for enabling said extension unit transmitter to relay said signals from said first source to said first remote transceiver;

second means responsive to receipt of remote signals from said first remote transceiver on said second carrier signal for enabling said second transceiver to relay said remote signals to said first signal source;

auto-que means for preventing operation of said first and second means in response to contemporaneous receipt of said first source signals and said remote signals; and punch through means for disabling said first means and enabling said second means in response to contemporaneous receipt of said first source signals and said remote signals when said first means is enabled to permit priority transmission of said remote signals to said first signal source, said punch through means being enabled by said first enabling means.

6. The combination of claim 5 wherein said auto-que means includes means for generating first and second detection signals in response to receipt of said first source and said remote signals, respectively; control means for controlling the enabling of said extension unit transmitter and said second transceiver in response to the generation of said first and second detection signals; and means for normally extending the time of application of said second detection signal to said control means for a predetermined period;

and wherein said punch through means includes means for disabling said extending means whenever said punch through means is enabled.

7. The combination of claim 5 wherein said first carrier signal source comprises a base station.

8. The combination of claim 5 wherein said punch through means includes sampling means for periodically disabling said extension unit transmitter and enabling said extension unit receiver when the former is enabled by said first enabling means to permit detection of said remote signals, and means responsive to detection of said remote signals for generating a control signal adapted to operate said second transceiver in the transmit mode.

9. The combination of claim 8 wherein said first transceiver includes means for generating at least two characteristic signals of different frequencies lying in the reception bandwidth of said extension unit receiver, and wherein said sampling means includes means for generating a first sampling pulse train comprising a plurality of pulses each having a first pulse width sufficiently great to permit detection of said first characteristic signal and means for generating a second sampling pulse train comprising a plurality of pulses each having a second pulse width sufficiently great to permit detection of said second characteristic signal.

10. The combination of claim 9 wherein said sampling means includes means responsive to the detection of one of said at least two characteristic signals for enabling said second pulse train generating means.

* * * * *